(12) United States Patent
Glass

(10) Patent No.: US 11,714,014 B2
(45) Date of Patent: Aug. 1, 2023

(54) MEASUREMENT SYSTEM FOR ADJUSTING TRUNNION BEARING ASSEMBLIES FOR A ROTARY DRUM

(71) Applicant: ANDRITZ INC., Alpharetta, GA (US)

(72) Inventor: William Donald Glass, Alpharetta, GA (US)

(73) Assignee: ANDRITZ INC., Alpharetta, GA (US)

( * ) Notice: Subject to any disclaimer, the term of this patent is extended or adjusted under 35 U.S.C. 154(b) by 269 days.

(21) Appl. No.: 17/104,597

(22) Filed: Nov. 25, 2020

(65) Prior Publication Data
US 2021/0156423 A1 May 27, 2021

Related U.S. Application Data

(60) Provisional application No. 62/939,994, filed on Nov. 25, 2019.

(51) Int. Cl.
*G01L 5/00* (2006.01)

(52) U.S. Cl.
CPC .......... *G01L 5/0023* (2013.01); *G01L 5/0019* (2013.01)

(58) Field of Classification Search
CPC ............... G01L 5/0009–0023; G01L 5/12
See application file for complete search history.

(56) References Cited

U.S. PATENT DOCUMENTS

| | | | | | |
|---|---|---|---|---|---|
| 4,089,216 | A | * | 5/1978 | Elias | G01L 1/2231 |
| | | | | | 73/862.31 |
| 4,129,036 | A | * | 12/1978 | Bliemeister | G01L 5/12 |
| | | | | | 384/549 |
| 4,182,168 | A | * | 1/1980 | Desch | G01L 5/12 |
| | | | | | 73/862.49 |
| 4,419,901 | A | * | 12/1983 | Ruppert | F16C 19/522 |
| | | | | | 73/862.49 |
| 2007/0266798 | A1 | * | 11/2007 | Gebhart | G01L 5/12 |
| | | | | | 73/862.49 |

(Continued)

FOREIGN PATENT DOCUMENTS

DE 2429454 1/1976

OTHER PUBLICATIONS

Canadian Application No. 3,100,507, Office Action dated Aug. 3, 2022, 3 pages.

(Continued)

*Primary Examiner* — Alexander A Mercado
(74) *Attorney, Agent, or Firm* — Kilpatrick Townsend & Stockton LLP

(57) ABSTRACT

A trunnion roller thrust measurement assembly includes a trunnion roller assembly and a thrust measurement assembly. The trunnion roller assembly includes a roller configured to provide rotary support of a rotary drum; a shaft attached to the roller, the shaft being aligned with an axis of rotation of the roller; and a bearing housing configured support an end of the shaft. The thrust measurement assembly includes a bearing housing end cap attachable to an end of the bearing housing; and one or more thrust sensors disposed on the bearing housing end cap. The one or more thrust sensors are configured to sense a thrust force exerted on the bearing housing end cap by an axial displacement of the shaft. An adjustment mechanism is utilized to skew the roller based on the sensed thrust force.

6 Claims, 11 Drawing Sheets

(56) References Cited

U.S. PATENT DOCUMENTS

| | | | | |
|---|---|---|---|---|
| 2008/0289436 A1* | 11/2008 | Laakkonen | ............... | G01L 5/12 |
| | | | | 73/862.49 |
| 2010/0098363 A1* | 4/2010 | Gebhart | ................. | F27D 19/00 |
| | | | | 384/450 |
| 2011/0216991 A1* | 9/2011 | Gebhart | .................... | F27B 7/22 |
| | | | | 384/450 |
| 2012/0101436 A1* | 4/2012 | Bazargan | ............. | G01L 1/2231 |
| | | | | 73/818 |
| 2013/0247687 A1* | 9/2013 | Gebhart | .................... | G01L 5/12 |
| | | | | 73/862.49 |
| 2016/0076354 A1* | 3/2016 | Lai | ........................ | G01L 3/1457 |
| | | | | 702/9 |
| 2016/0297102 A1* | 10/2016 | Okada | ................... | F16C 19/522 |

OTHER PUBLICATIONS

Canadian Application No. 3,100,507, Office Action dated Nov. 16, 2021, 5 pages.

Canadian Application No. 3,100,507, Notice of Allowance dated Apr. 13, 2023, 1 page.

* cited by examiner

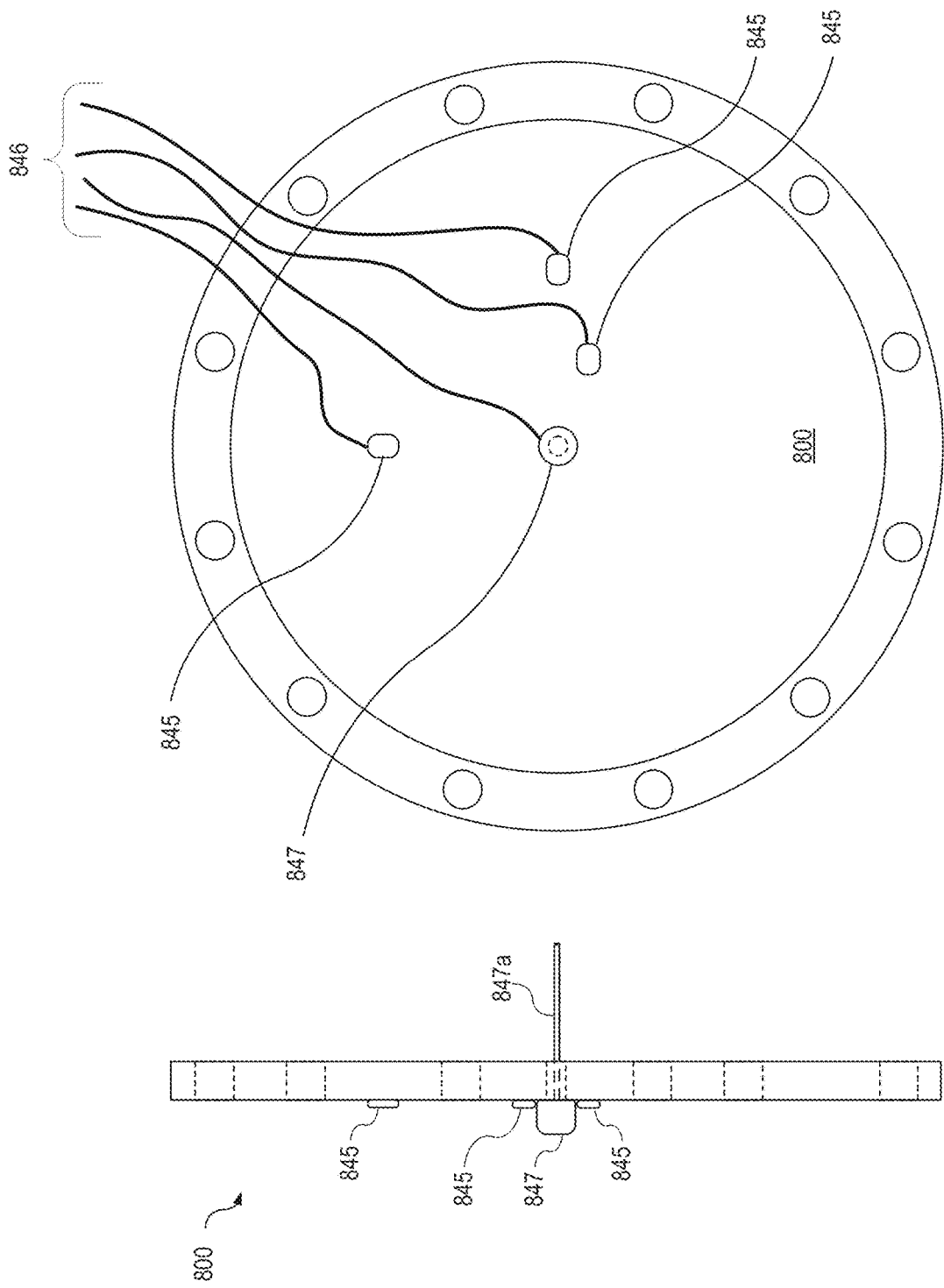

MEASUREMENT SYSTEM FOR ADJUSTING TRUNNION BEARING ASSEMBLIES FOR A ROTARY DRUM

CROSS-REFERENCES TO RELATED APPLICATIONS

This application claims the benefit of U.S. Provisional Application No. 62/939,994, filed Nov. 25, 2019; the content of which is hereby incorporated herein by reference in its entirety.

BACKGROUND

Large scale rotary drums are used in a variety of industrial processes. For example, rotary drum dryers, a type of rotary drum, can be used to reduce moisture in fertilizers, ores, sewage sludge, and many other materials efficiently and economically. Rotary kilns, another type of rotary drum, can be used in cement and potash production, or to calcinate minerals such as lime, petroleum coke, and soda ash. Likewise, rotary coolers, still another type of rotary drum, can be used to reduce product temperatures to more manageable levels. Rotary drums have a number of other industrial applications, including cleaning, shredding, coating, and separating many types of particulate matter.

As used herein, "rotary drum" describes industrial equipment having an elongate, generally cylindrical, rotating drum or tube. Steel or concrete structures support the drum at a slight angle to allow solid product to flow downhill, or gaseous product to diffuse uphill. A drive gear typically concentrically encircles one section of the drum. Smaller riding rings disposed upstream and downstream of the drive gear also encircle the drum. These "riding rings" are also commonly known as "live rings," "track rings," or "tires." Trunnion roller assemblies, which are typically disposed on the supporting steel or concrete structures, engage the riding rings and support the drum as the drum rotates. Depending upon the length of the drum, the drum may have between two and five riding rings. Typically, each riding ring rests upon two trunnion roller assemblies.

Rotary drums can vary substantially in size depending upon application and the intended throughput capacity, but such rotary drums tend to be quite heavy. For example, a typical rotary lime calcination kiln may be between about 200 feet to about 400 feet long, be constructed of carbon steel, refractory bricks, and other durable material, and may weigh between about 200 tons ("T") to about 500 T. A trunnion roller assembly may include a trunnion roller having a shaft extending from the center of rotation of the trunnion roller. The shaft may be supported by bearings disposed in bearing housings located on either side of the trunnion roller. The bearing housings may be bolted to the concrete or steel support structure. The trunnion roller rotatably engages the riding ring. When a new rotary drum is erected, the rotary axis of the trunnion roller may be aligned to be generally parallel to the rotary axis of the drum. As the drum and riding ring rotate, the supporting trunnion rollers rotate while also distributing the weight of the drum into the larger steel or concrete support structure.

Rotary drums may also have axial thrust roller assemblies disposed beneath the drum on either side of the riding ring. The rotary axis of the thrust rollers are approximately perpendicular to the rotary axis of the drum. In this configuration, the downhill thrust rollers bear the entire downhill axial thrust of the sloped drum. Typical thrust rollers are not designed to bear the entire downward thrust of the drum for prolonged periods. In order to reduce the downward thrust on the thrust roller assemblies, the more robust trunnion rollers may be "skewed" or pivoted such that the trunnion rollers may bear some of the downward thrust of the drum. In this way, an uphill thrust vector may be added to balance the downhill thrust vector of the angled drum. Balancing the forces may reduce wear on the thrust rollers. Properly skewed trunnion rollers can support the drum by bearing against both the vertical and horizontal force vectors of the angled drum. The skewed trunnion rollers can relieve the engagement of the riding ring with the downward thrust roller, such that the riding ring appears to "float" between the uphill and downhill thrust rollers disposed on either side of the riding ring. For this reason, skewing the trunnion rollers is sometimes known as "floating" the kiln.

Skewing the trunnion rollers imparts a net axial force to one end of the trunnion roller assembly. As a result, the shaft of the trunnion roller slides to the end of one of the trunnion roller assembly bearing housings and bears against a thrust bearing disposed between the end of the shaft and the end cap of the bearing housing.

Operational conditions of the rotary drum can change frequently over a typical multi-month production run. Due to their size, many rotary drums are located outdoors, exposed to the elements, and experience multiple day to night temperature shifts as well as seasonal temperature shifts. Problems with burners, coolers, or the drive motor, or operation of the rotary drum in extreme natural temperatures may prevent even heat distribution throughout the rotary drum. As a result, the rotary drum may warp or twist. Furthermore, processing large amounts of particulate matter can create areas of localized stress that can deform the drum. A rotary drum can be quite heavy, and can become slightly elliptical over time due to its own weight and shape.

As a result, skewed trunnion roller assemblies that were properly adjusted for operating conditions at a given time can become improperly adjusted as operating and environmental conditions change. Current methods of measuring and recording the skew of trunnion roller assemblies pose safety risks and are vulnerable to human error.

One current method of measuring may be referred to as the "hammer test." In the current hammer test, a technician may hit the two bearing housing end caps with a hammer and listen for the emitted sound. The bearing housing end cap loaded with the thrust force of the trunnion roller shaft emits a solid sound, whereas the unloaded bearing housing end cap emits a hollow sound. Ideally, the technician will keep a log of the skewed position of the trunnion roller assemblies and record any adjustments that were made. In practice, however, record keeping may not be consistent. In addition to human error and inconsistent record keeping, the hammer test cannot provide accurate data on the amount of thrust that the loaded bearing housing end cap experiences. Moreover, the hammer test requires the technician to get very close to trunnion roller assembly. The point at which the trunnion roller bears against the rotating riding ring of the rotary drum is a serious pinch point that could lead to severe injury or death if any part of a person or their clothing were caught in the pinch point.

Improper skewing of the trunnion roller assemblies can lead to premature bearing wear and premature wear of other rotary drum components, which can contribute to premature breakage. For example, improperly skewed trunnion roller assemblies can experience localized contact pressures with the riding ring. In some cases, these localized contact pressures can exceed the designed load capacity of the trunnion roller and/or riding ring. If left unaddressed, misalignment can result in cracks and eventually, total breakdown and collapse of the trunnion roller assembly. In cases where the trunnion roller shaft pushes against a bearing housing end cap with excessive force, the trunnion roller shaft may eventually break through the bearing housing end cap.

Conventional methods for detecting the trunnion roller shaft position and determining the amount of force exerted on the bearing housing end cap by the trunnion roller shaft are dangerous and imprecise. As a result, these methods increase the risk of equipment damage.

SUMMARY

The present disclosure relates generally to rotary drum equipment and more particularly, but not exclusively, to systems and methods for measuring and adjusting thrust for rotary drums and adjusting the position of support rollers disposed at an angle relative to the rotary drums.

According to various aspects there is provided a trunnion roller thrust measurement assembly. In some aspects, the trunnion roller thrust measurement assembly may include: a trunnion roller assembly and a thrust measurement assembly. The trunnion roller assembly may include a roller configured to provide rotary support of a rotary drum; a shaft attached to the roller, the shaft being aligned with an axis of rotation of the roller; and a bearing housing configured support an end of the shaft. The thrust measurement assembly may include a bearing housing end cap attachable to an end of the bearing housing; and one or more thrust sensors disposed on the bearing housing end cap. The one or more thrust sensors may be configured to sense a thrust force exerted on the bearing housing end cap by an axial displacement of the shaft. An adjustment mechanism may be utilized to skew the roller based on the sensed thrust force According to various aspects there is provided a trunnion roller thrust measurement system. In some aspects, the trunnion roller thrust measurement system may include: a trunnion roller thrust measurement assembly, a trunnion roller assembly, a thrust measurement assembly, and a processor. The trunnion roller thrust measurement assembly may include a trunnion roller assembly, including a roller configured to provide rotary support of a rotary drum; a shaft attached to the roller, the shaft being aligned with an axis of rotation of the roller; and a bearing housing configured support an end of the shaft. The thrust measurement assembly may include a bearing housing end cap attachable to an end of the bearing housing; and one or more thrust sensors disposed on the bearing housing end cap. The one or more thrust sensors configured to sense a thrust force on the bearing housing end cap. The processor may be configured to receive measurements of the thrust force from the thrust measurement assembly; determine that a thrust measurement received from the thrust measurement assembly is not within a range of acceptable thrust values; and generate a notification indicating that the trunnion roller assembly needs adjustment.

According to various aspects there is provided a method for adjusting a trunnion bearing assembly for a rotary drum using a trunnion roller thrust measurement system. In some aspects, the method may include sensing, by one or more thrust sensors, a thrust force on a bearing housing end cap attached to an end of a bearing housing of a trunnion roller assembly; receiving, by a processor of the trunnion roller thrust measurement system, thrust measurements of the thrust force on the bearing housing end cap; determining, by the processor, that a thrust measurement received from the thrust measurement assembly is not within a range of acceptable thrust values; generating, by the processor, a notification indicating that the trunnion roller assembly needs adjustment; and adjusting the trunnion bearing assembly based on the notification.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

FIG. 8A is a side view of another example of a bearing housing end cap according to some aspects of the present disclosure.

FIG. 8B is a facing view of the example bearing housing end cap of FIG. 8A according to some aspects of the present disclosure.

DETAILED DESCRIPTION

Figure 1:
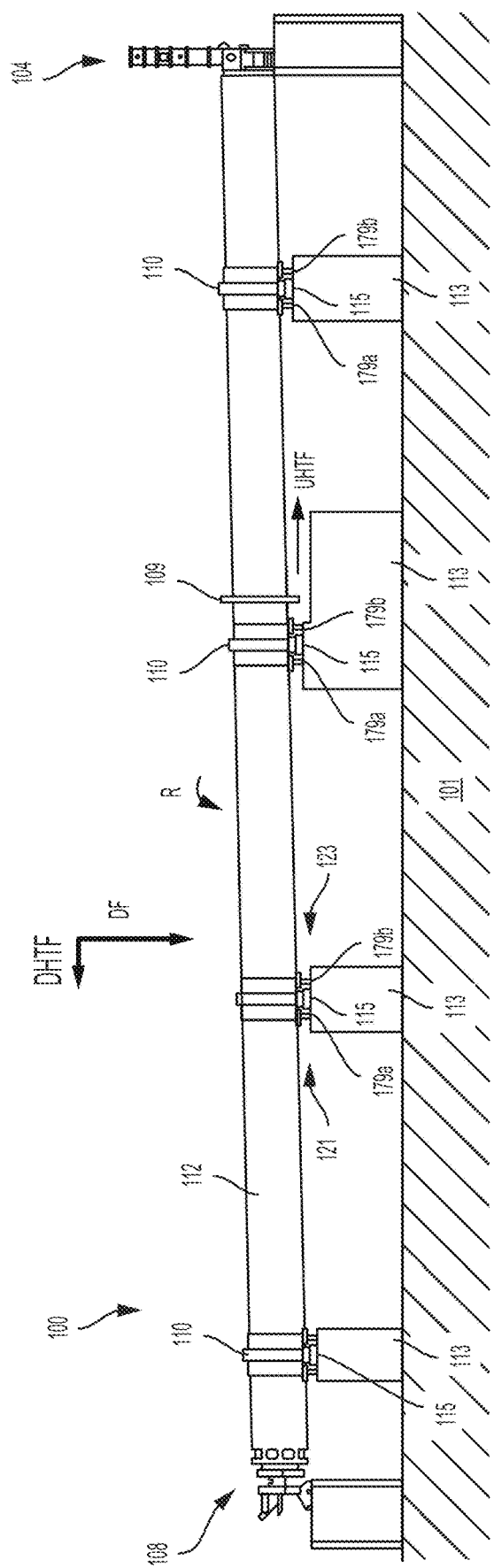
FIG. 1 is a side view of an example of a rotary drum assembly according to some aspects of the present disclosure.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms "upper" and "lower" are relative to each other in location, i.e., an upper component is located at a higher elevation than a lower component in a given orientation, but these terms can change if the device is flipped. The terms "uphill" and "downhill" are relative to the angled drum of a rotary drum assembly. For example, an "uphill" side of a trunnion exemplary roller assembly is disposed closer to the upper end of a rotary drum assembly than it is to the lower, downhill end of the rotary drum assembly. The terms "inlet' and "outlet" are relative to a fluid or particulate flowing through them with respect to a given structure, e.g., a fluid flows through the inlet into the structure and flows through the outlet out of the structure. The terms "upstream" and "downstream" are relative to the direction in which a fluid flows through various components, i.e., the flow of fluids through an upstream component prior to flowing through the downstream component.

The terms "horizontal" and "vertical" are used to indicate direction relative to an absolute reference, i.e., ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e., the surface of the Earth. The terms "upwards" and "downwards" are also relative to an absolute reference; an upwards flow is always against the gravity of the Earth.

FIG. 1 is a side view of an example of a rotary drum assembly 100 according to some aspects of the present disclosure. The rotary drum assembly 100 may include a drive wheel 109, riding rings 110, and a rotary drum 112. The rotary drum 112 may be an elongate tube and may span a number of support structures 113. The rotary drum 112 may be disposed at an acute angle relative to the ground 101. For example the angle may be in the range of about 0.86 degrees (e.g., about 1.5%) to about 2.86 degrees (e.g., about 5.0%). In some cases, the angle may be in the range of 1.15 degrees (e.g., about 2%) to 1.43 degrees (e.g., about 2.5%). Other angular ranges may be used. Particulate feed may be introduced at an upper end 104 of the rotary drum 112. The angle allows gravity to carry particulate feed material along the length of the rotary drum 112 as the rotary drum 112 rotates. Processed material may be collected near a lower end 108 of the rotary drum 112.

A number of riding rings 110 may be distributed along the length of the rotary drum 112. A drive wheel 109 may encircle the rotary drum 112 and may engage sections of the rotary drum 112. A motor (not shown) may transfer rotational motion to the drive wheel 109 causing the rotary drum 112 and riding rings 110 to rotate in a direction 'R'. The rate of rotation can depend upon the intended use of the particular rotary drum assembly 100. For example, a rotary drum assembly for a rotary limekiln may rotate in a range of 0.5 revolutions per minutes ("rpm") to 4 rpm.

Figure 3:
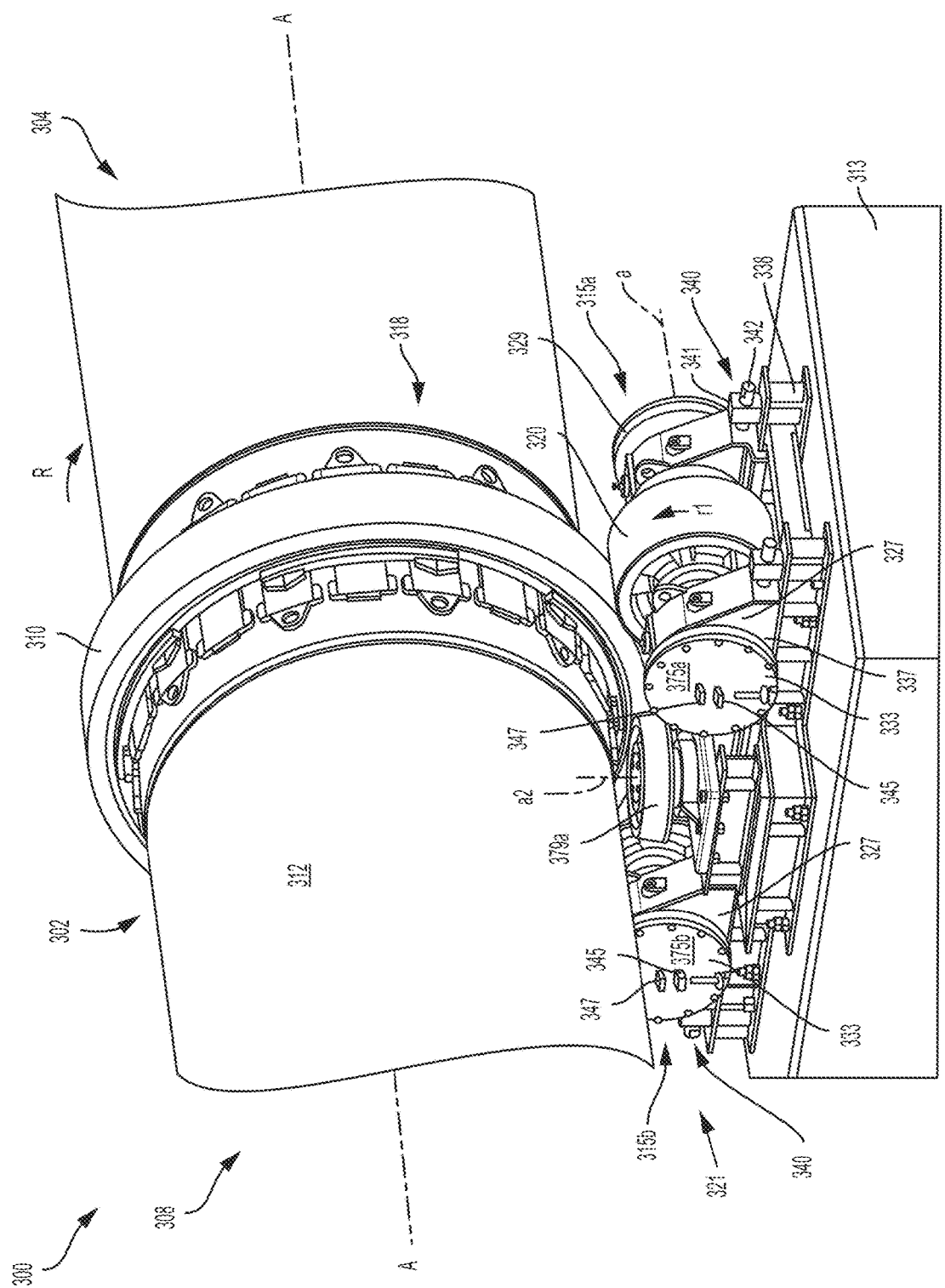
FIG. 3 is a perspective view of a portion of a rotary drum assembly resting upon trunnion roller assemblies including examples of trunnion roller thrust measurement assemblies according to some aspects of the present disclosure.
Figure 4:
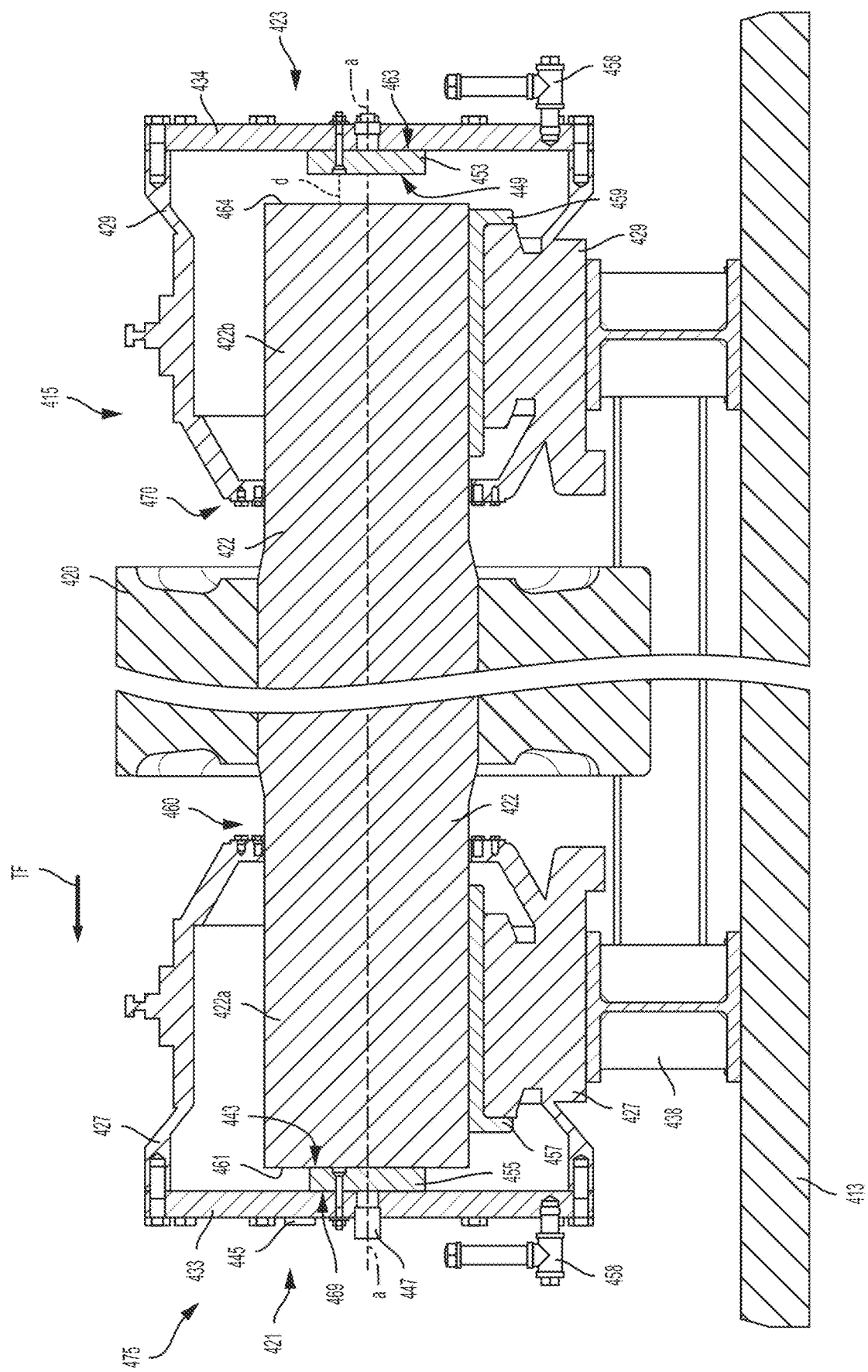
FIG. 4 is a cross-sectional side view of trunnion roller assembly including an example of a trunnion roller thrust measurement assembly according to some aspects of the present disclosure.

Each riding ring 110 may rest upon two trunnion roller assemblies 115, for example, the trunnion roller assemblies illustrated in FIG. 3 or 4. Each trunnion roller assembly 115 may have a downhill side 121 distally disposed from an uphill side 123. The trunnion roller assemblies 115 may be secured to an underlying support structure 113. The trunnion roller assemblies 115 support and distribute a majority of the downward force (DF) produced by the rotary drum 112.

The rotary drum assembly 100 may be heavy. For example, a rotary limekiln can have a length of about 200 feet to about 500 feet, and an outer diameter of about 9 feet to about 20 feet. The inside of a rotary limekiln may be lined with a refractory material such as kiln bricks. As a result, a rotary limekiln can weigh between about 200 T and about 500 T. Because the rotary drum 112 is angled with respect to the ground 101, the mass of the rotary drum 112 may exert a downhill thrust force (DHTF) e.g., a force vector pointing downhill) and a downward force DF (e.g., a force vector representing the force of gravity on the rotary drum assembly 100).

Axial thrust roller assemblies 179a, 179b may be disposed beneath the rotary drum 112 and adjacent to each riding ring 110. The thrust roller assemblies may include a downhill thrust roller assembly 179a and an uphill thrust roller assembly 179b. In some implementations, the uphill thrust roller assembly 479b may be omitted. When a downhill thrust roller assembly 179a engages a riding ring 110, the downhill thrust roller assembly 179a may provide an uphill thrust force (UHTF) to balance the downhill thrust force DHTF of the angled rotary drum 112. Thrust roller assemblies 179b, 179b, in particular, downhill thrust roller assemblies 179a, may not withstand the full DHTF of the rotary drum 112 for prolonged periods.

Figure 2A:
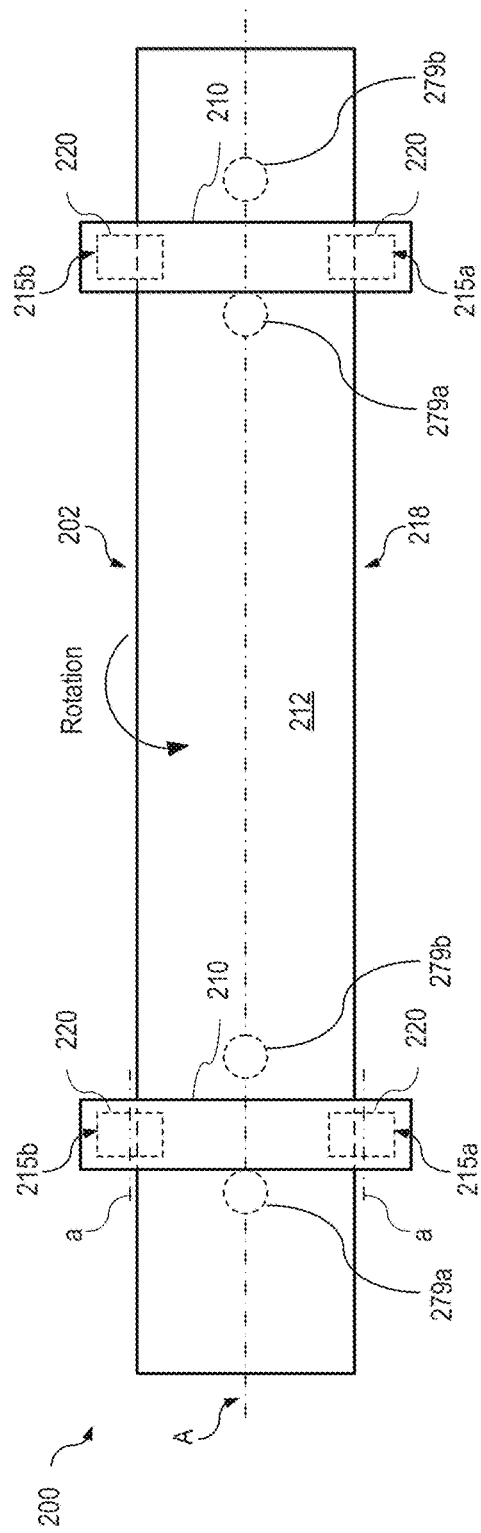
FIG. 2A is a top view of an example of a rotary drum assembly with the trunnion roller assemblies axially aligned with the axis of rotation of the rotary drum according to some aspects of the present disclosure.

FIG. 2A is a top view of an example of a rotary drum assembly 200 with the trunnion roller assemblies axially aligned with the axis of rotation of the rotary drum according to some aspects of the present disclosure. The rotary drum assembly 200 may be similar to the rotary drum assembly 100 illustrated in FIG. 1. Referring to FIG. 2A, the trunnion roller assemblies 215a, 215b may include the trunnion rollers 220. The trunnion roller assemblies 215a, 215b may be, for example, the trunnion roller assemblies 115 in FIG. 1. The riding rings 210 may rest upon the trunnion rollers 220 and may rotate the rollers 220 as the riding rings 210 rotate. In FIG. 2A, the respective axes of rotation 'a' of the rollers are arranged parallel to the axis of rotation 'A' of the rotary drum 212 (when viewed from the top). FIG. 2A illustrates the position of the axis of rotation 'a' of the trunnion rollers 220 upon startup of a newly constructed rotary drum assembly 200.

For a newly constructed rotary drum assembly 200, the axes of rotation 'a' of the trunnion rollers 220 may be set parallel to the axis of rotation 'A' of the rotary drum 212 as illustrated in FIG. 2A. The parallel alignment may allow the rotary drum 212 to expand or contract due to operating temperatures without exerting undue axial stress on the trunnion roller assemblies 215a, 215b. For example, if the rotary drum assembly 200 is a rotary kiln or a rotary dryer, the rotary drum 212 may lengthen as the rotary drum 212 warms to operating temperatures. Similarly, for rotary coolers, the rotary drum 212 may shorten slightly as the rotary coolers cool to production temperatures. When the axes of rotation 'a' of the trunnion rollers 220 is parallel to the axis of rotation 'A' of the rotary drum 212, the downhill thrust roller 279a may be subjected to the full downhill thrust force DHTF of the rotary drum 212.

The parallel alignment of the axes of rotation 'a' of the trunnion rollers and the axis of rotation 'A' of the rotary drum 212 shown in FIG. 2A can cause failure of the downhill thrust rollers 279a as they support the full downhill thrust force DHTF of the rotary drum 212 for prolonged periods of time. Failure of a downhill thrust roller 279a can cause the multi-ton rotary drum 212 to slip off the trunnion roller assembly 215a, 215b causing equipment damage, production delays, and significant repair costs, as well as the attendant safety concerns.

Even temporary losses of such large pieces of equipment can result in significant production loss and may cause plant owners to seek replacement processed material on the open market to maintain production. Such actions can increase production costs significantly and adversely impact profitability. Further, repair of a damaged rotary drum 212 can take months as new segments of the rotary drum 212 are fabricated, tested, transported, and installed. Complete replacement of a damaged rotary drums 212 can take longer and be more costly.

Figure 2B:
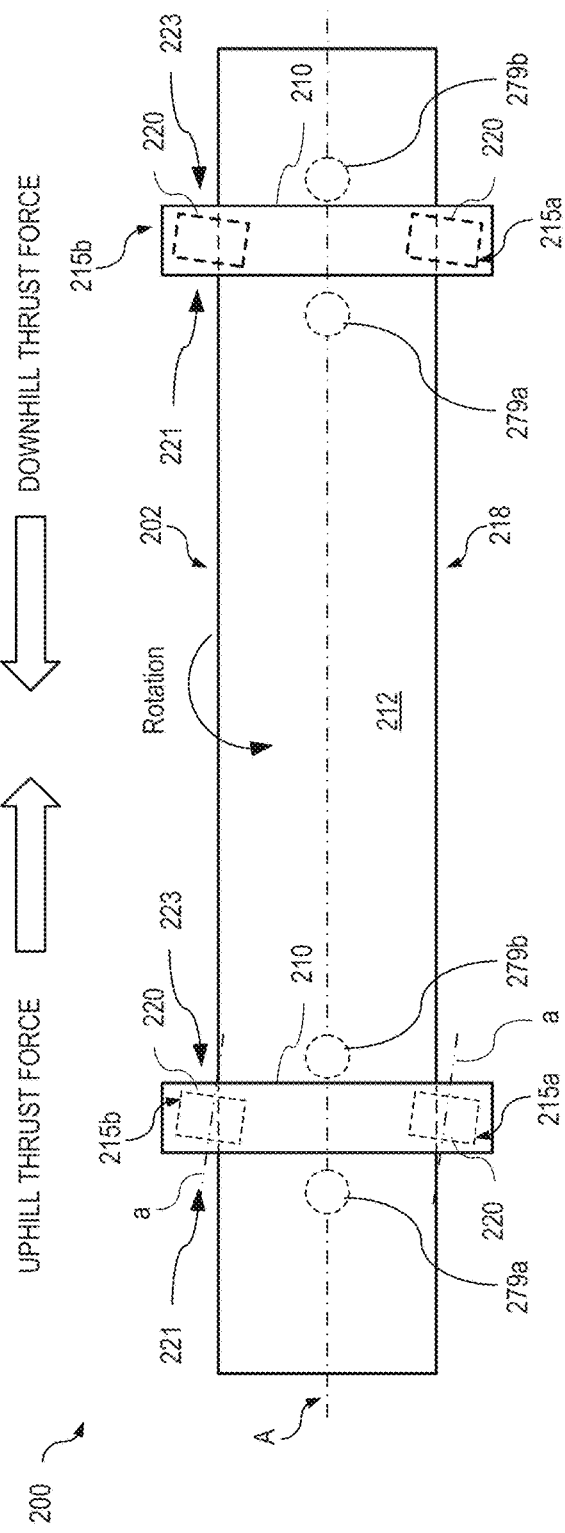
FIG. 2B is a top view of an example of a rotary drum assembly with the trunnion roller assemblies axially angled relative to the axis of rotation of the rotary drum according to some aspects of the present disclosure.

To avoid failure of the downhill thrust rollers 279a, prior to subsequent startups of rotary drum assembly 200, the axes of rotation 'a' of the trunnion rollers 220 may be skewed to some degree with respect to the axis of rotation 'A' of the rotary drum 212. FIG. 2B is a top view of an example of a rotary drum assembly 200 with the trunnion roller assemblies 215a, 215b axially angled, or "skewed," relative to the axis of rotation of the rotary drum 212 according to some aspects of the present disclosure.

Axially angling, or "skewing," the axes of rotation 'a' of the trunnion rollers 220 can enable the trunnion rollers 220 to "bite" into the riding rings 210 to balance the amount of downhill thrust force (DHTF) bearing on the downhill side 221 of the trunnion roller assemblies 215a, 215b. The skewed trunnion roller assemblies 215a, 215b may exert uphill thrust forces (UHTF) at each trunnion roller assembly 215a, 215b to balance the DHTF of the mass of the rotary drum 212. The trunnion roller assemblies 215a, 215b also support the downward force (DF) of the rotary drum 212, as shown in FIG. 1. Compared to the trunnion roller assembly 215a, 215b arrangement shown in FIG. 2A, the magnitude of the uphill thrust force UHTF of the skewed trunnion roller assemblies 215a, 215b shown in FIG. 2B may be less than the magnitude of the uphill thrust force UHTF of the downhill thrust rollers 279a shown in FIG. 2A.

Referring to FIGS. 2B and 4, the axes of rotation 'a' of the trunnion rollers 220 may be skewed with respect to the axis of rotation 'A' of the rotary drum 212 by adjusting the position of the trunnion roller assemblies 215a, 215b. As illustrated in FIG. 2B, the downhill side 221 of the trunnion roller assembly 215a may be adjusted inward (e.g., toward the axis of rotation 'A' of the rotary drum 212) on the drum side 218 that has a rotational direction downward relative to the trunnion roller assembly 215a, thereby skewing the axis of rotation 'a' of the trunnion roller 220. As the trunnion roller 220 begins to bear some of the DHTF of the mass of the rotary drum 212, the trunnion roller 220 may transmit some of the DHTF to the downhill end of the shaft on which the trunnion roller 220 rotates (e.g., the trunnion shaft end 461 in FIG. 4), thereby increasing the DHTF on the downhill end bearing cap (e.g., the first bearing housing end cap 433 in FIG. 4) of the trunnion roller assembly 215a.

Similarly, the uphill side 223 of the trunnion roller assembly 215b may be adjusted inward (e.g., toward the axis of rotation 'A' of the rotary drum 212) on the drum side 202 that has a rotational direction upward relative to the trunnion roller assembly 215b, thereby skewing the axis of rotation 'a' of the trunnion roller 220 and increasing thrust on the downhill side 221 of the trunnion roller assembly 215b. In this manner, the axes of rotation 'a' of the trunnion rollers 220 may be adjusted to be at an angle relative to the axis of rotation 'A' of the rotary drum 212. Skewing the axes of rotation 'a' of the trunnion rollers 220 in this manner is referred to as "floating" the rotary drum 212. The skewed trunnion roller assemblies 215a and 215b on either side 218, 202 of the rotary drum 212 may balance the riding rings 210 between the distally disposed trunnion roller assemblies 215a, 215b, thereby relieving the DHTF on the downhill thrust rollers 279a. The riding rings 210 may move in an uphill direction away from the downhill thrust rollers 279a.

The uphill thrust bearing assemblies 279*b* may prevent negative consequences of over-skewing the trunnion roller assemblies 215*a*, 215*b*.

The trunnion roller assemblies 215*a*, 215*b* may be skewed in the range of about 0.000 inches to about 0.150 inches or another range. It will be understood that the skew of trunnion roller assemblies 215*a*, 215*b* illustrated in FIG. 2B is exaggerated to illustrate the concept.

According to some aspects of the present disclosure, systems and methods may be provided for measuring thrust generated by the trunnion roller shaft on the bearing housing end cap and adjusting (e.g., skewing) trunnion roller assemblies to mitigate excessive thrust on the bearing housing end caps of the trunnion roller assemblies. FIG. 3 is a perspective view of a portion of a rotary drum assembly 300 resting upon trunnion roller assemblies 315*a*, 315*b* including examples of trunnion roller thrust measurement assemblies 375*a*, 375*b* according to some aspects of the present disclosure. The rotary drum assembly 300 may be, for example, the rotary drum assembly 200. The trunnion roller assemblies 315*a*, 315*b* (e.g., the trunnion roller assemblies 215*a*, 215*b*) may include trunnion rollers 320 (e.g., the trunnion rollers 220) disposed against the riding ring 310 of the rotary drum assembly 300. The bearing housing end caps 427, 433 may include the trunnion roller thrust measurement assemblies 375*a*, 375*b*.

The rotary drum 312 and riding ring 310 may rotate in clockwise direction 'R' when viewed from the lower end 308 of the rotary drum 312. The trunnion roller 320 on the trunnion roller assembly 315*a* disposed under the downwardly rotating drum side 318 rotates in a counter-clockwise direction 'r1' when viewed from the lower end 308 of the rotary drum 312. The trunnion roller on the trunnion roller assembly 315*b* disposed under the upwardly rotating drum side 302 (see the trunnion roller 220*b* FIG. 2B) rotates in a counter-clockwise direction when viewed from the lower end 308 of the rotary drum 312. In this manner, the trunnion rollers 320 can be said to be in "rotary supporting engagement" with the riding ring 310. The downhill thrust roller assembly 379*a* has an axis of rotation 'a2' that may be generally perpendicular to the axis of rotation 'a' of the trunnion roller assemblies 315*a*, 315*b*. The direction of rotary drum rotation is described rotating in a clockwise direction for purposes of explanation. It should be appreciated that the direction of rotary drum rotation may be in a counter-clockwise direction without departing from the scope of the present disclosure.

FIG. 4 is a cross-sectional side view of a trunnion roller assembly 415 including an example of a trunnion roller thrust measurement assembly 475 according to some aspects of the present disclosure. The trunnion roller thrust measurement assembly 475 may be, for example, the trunnion roller thrust measurement assembly 375*a*, 375*b* shown in FIG. 3. FIG. 4 illustrates the trunnion roller thrust measurement assembly 475 when the axis of rotation 'a' of the trunnion roller 420 is parallel to the axis of rotation 'A' of the rotary drum 212 as shown, for example, in FIG. 2A.

The trunnion roller 420 may include a trunnion shaft 422 extending along the axis of rotation 'a' of the trunnion roller 420. In some implementations, the trunnion roller 420 may encircle the trunnion shaft 422. In some implementations, the trunnion roller 420 may not encircle the trunnion shaft 422; the trunnion shaft 422 may be bifurcated and extend from each side of the trunnion roller 420.

Each end 461, 464 of the trunnion shaft 422 may be disposed in a bearing housing 427, 429 adjacent to the respective shaft ends 461, 464. Each bearing housing 427, 429 may terminate in a bearing housing end cap 433, 434. The trunnion roller thrust measurement assembly 475 may include the bearing housing end cap 433, one or more thrust measurement sensors 445, and a distance sensor 447. The bearing housings 427, 429 may further include a bearing support frame, for example, the bearing support frame 337 illustrated in FIG. 3. The bearing support frame may be affixed to a base structure 438. The base structure 438 may be a steel structure or other structure. The base structure 438 may be affixed to a support 413, for example, a reinforced concrete support or other support.

Referring again to FIG. 3, lateral adjustment mechanisms 340 may engage sides of the bearing housings 327, 329, for example, at sides of the bearing support frames 437. A lateral adjustment mechanism 340 may include a bolt 342 extending through a threaded block 341. The threaded block 341 may be affixed to the base structure 338. The bolt 342 may be rotated to extend or retract the bolt 342 relative to the threaded block 341. The distal end of the bolt 342 may engage the side of the bearing support frame 337. For example, the bolt 342 of the lateral adjustment mechanism 340 on the downhill side 321 of the trunnion roller assembly 315*a* may be extended to push the downhill side 321 of the trunnion roller assembly 315*a* inward toward the axis rotation 'A' of the rotary drum 312, thereby angling, or skewing, the trunnion roller assembly 315*a* as illustrated, for example, by the trunnion roller assembly 215*a* in FIG. 2B. In some implementations, the lateral adjustment mechanisms 340 may be pneumatic systems.

The trunnion roller thrust measurement assemblies 375*a*, 375*b* may include a thrust sensor 345 and optionally a distance sensor 347. The thrust sensor 345 and the distance sensor 347 may be affixed to the first bearing housing end cap 333 of the first bearing housing 327. In some implementations, the thrust sensor 345 may be affixed to the first bearing housing 327 while the distance sensor 347 may be affixed to the second bearing housing 329 or vice versa. In other implementations, both the thrust sensor 345 and the distance sensor 347 may be affixed to the second bearing housing 329.

Figure 9:
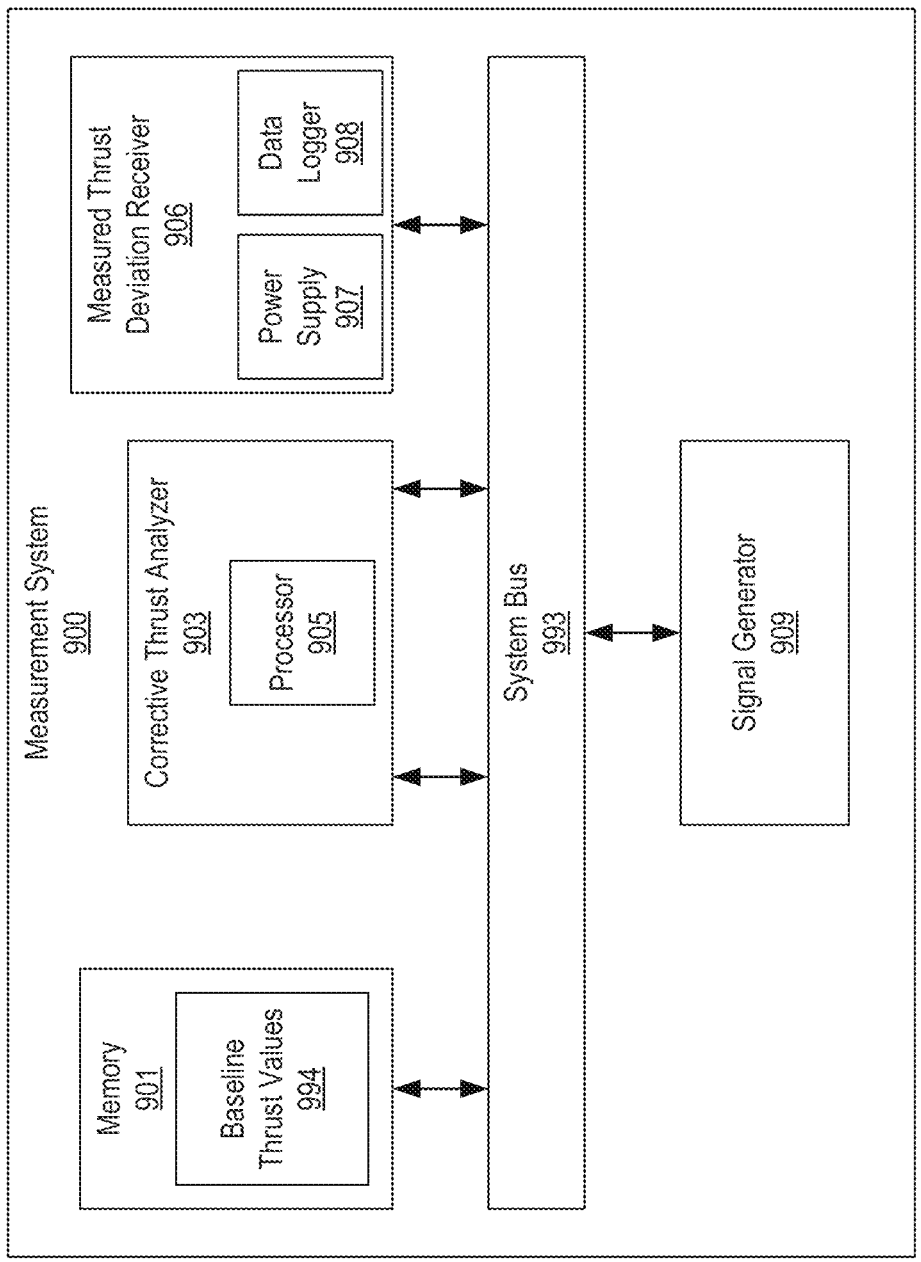
FIG. 9 is a block diagram illustrating an example of a measurement system according to some aspects of the present disclosure.

In some implementations, the thrust sensor 345 and distance sensor 347 may include wiring configured to connect the thrust sensor 345 and the distance sensor 347 to a data processor, for example, but not limited to, a programmable logic controller ("PLC"), a distributed control system ("DCS"), or other processor of a measurement system (e.g., the measurement system of FIG. 9). In some implementations, the thrust sensor 345 and the distance sensor 347 may be wireless. In some implementations, the distance sensor 347 may be omitted.

The thrust sensor 345 may be, for example, but not limited to, a strain gauge. A strain gauge includes a conductive metal wire wrapped around pins or a conductive metal foil cut into a zigzag shape. When a force is applied to the metallic wire or foil, the strain increases the length of the wire or foil and reduces the diameter of the wire or the thickness of the foil, respectively. As the length of the conductive material increases or the thickness of the conductive material decreases, the electrical resistance also increases. This resistance change can be measured and calibrated against the applied force. In this way, the strain gauge can also be used to calculate the displacement of the trunnion shaft (e.g., the trunnion shaft 422).

The distance sensor 347 may be a linear displacement sensor, a linear variable differential transformer (LVDT), a laser, a proximity sensor (e.g., a prox probe) or another position sensor. A linear displacement sensor may have an output signal that proportional to the distance that the sensing object has traveled relative to a reference point. The displacement measurement may also indicate the direction of motion.

Figure 5:
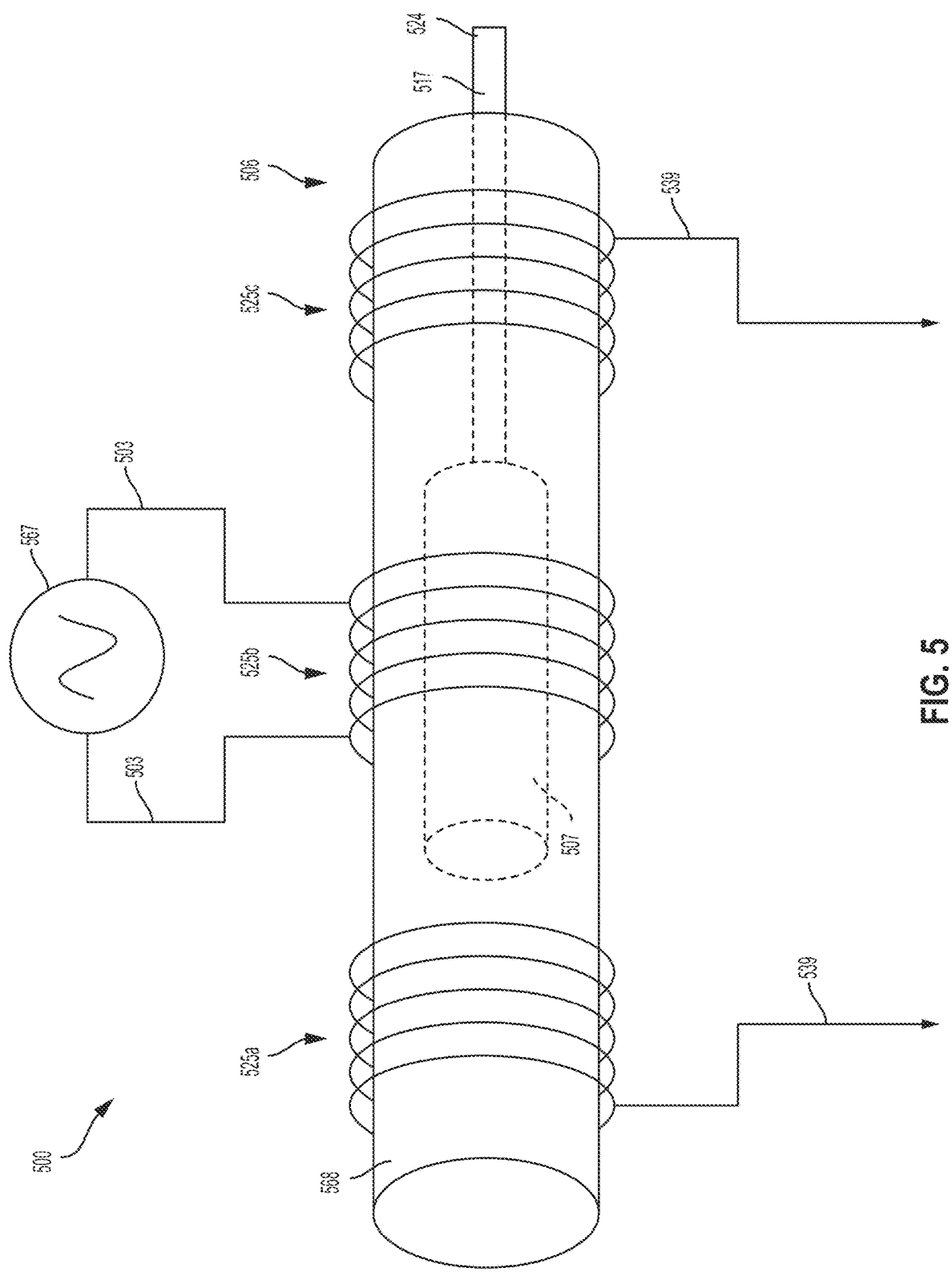
FIG. 5 is a simplified schematic of an example of an LVDT according to some aspects of the present disclosure.

FIG. 5 is a simplified schematic of an example of an LVDT 500 according to some aspects of the present disclosure. An LVDT 500 may include a coil assembly 506 and a core 507 made of permeable material. The coil assembly 506 may have three coils 525a, 525b, and 525c of wire wound on a hollow form 568. The core 507 can slide freely through the center of the hollow form 568. An alternating current (AC) source 567 may provide an AC signal to excite the middle coil 525b to produce a magnetic flux. The AC signal may be transmitted through a conduit 503. The magnetic flux may be coupled with the two adjacent, outer coils 525a, 525c disposed on either side of the middle coil 525b, thereby inducing an AC voltage in each outer coil 525a, 525c. A rod 517 connects the core 507 to a component that experiences displacement. For example, the distal end 524 of the rod 517 may abut an end of a shaft (e.g., the first end 461 of the trunnion shaft 422 in FIG. 4). In some implementations, a thrust bearing (e.g., the first thrust bearing 455 in FIG. 4) may be affixed to the end of the shaft. In such cases, the distal end 524 of the rod 517 may abut the thrust bearing.

To measure displacement, the LVDT 500 associates a particular AC excitation signal value with a given position of the core 507 based on the electromagnetic coupling of the AC excitation signal on the middle coil 525b to the core 507 and to the adjacent outer coils 525a, 525c. The position of the core 507 affects the strength of the signal from the middle coil 525b that is coupled to each of the adjacent coils 525a, 525c. The two outer coils 525a, 525c are wound in series but in opposite directions, resulting in the signals from the two outer coil being 180 degrees out of phase. As a result, the phase of the output signal determines the direction of the displacement and the amplitude of the output signal determines amount of the displacement. The two outer coils 525a, 525c may transmit an output signal through an output conduit 539.

Referring again to FIG. 4, the first bearing housing 427 may be disposed upon the base structure 438. A first section 422a of the trunnion shaft 422 may be disposed within the first bearing housing 427. The first section 422a of the trunnion shaft 422 may have a first shaft end 461. A first journal bearing 457 may be disposed between the first section 422a of the trunnion shaft 422 disposed within the first bearing housing 427 and the first bearing housing 427. The first journal bearing 457 can reduce the friction between the first section 422a of the trunnion shaft 422 and the first bearing housing 427 as the trunnion shaft 422 rotates. Packing rings (not shown) may seal the trunnion roller end 460 of the first bearing housing 427. A sight device 458 may be used to gauge the level of lubricant in the first bearing housing 427.

The first bearing housing 427 may further include a first bearing housing end cap 433 at the distal end of the first bearing housing 427 opposite the trunnion roller end 460. A first thrust bearing 455 may be disposed inside the first bearing housing 427. A thrust bearing is a bearing primarily designed to support an axial load. As such, a thrust bearing may be a rotary bearing having a first end configured to rotate with the adjoining first shaft end 461 and a second end configured to engage the first bearing housing end cap 433 and remain static. Fasteners may affix the first thrust bearing 455 to the first bearing housing end cap 433. In some implementations, the thrust bearing may be, for example, but not limited to, a cylindrical thrust roller bearing (e.g., a thrust needle roller bearing), a thrust ball bearing, a cylindrical thrust roller bearing, a tapered roller thrust bearing, a spherical roller thrust bearing, a fluid bearing, and a magnetic bearing, or other type of bearing. In some implementations, the thrust bearing may be a thrust washer, a thrust cap, or a washer bearing. The thrust washer, thrust cap, or washer bearing may be a single ring disposed between the first bearing housing end cap 433 and the first shaft end 461, and may be made of brass, bronze, or other material having a low coefficient of friction.

The second bearing housing 429 is distally disposed from the first bearing housing 427. The second bearing housing 429 may include a second bearing housing end cap 434 and a second thrust bearing 453 affixed to the second bearing housing end cap 434. The second thrust bearing 453 may be disposed inside the second bearing housing 429 and may be configured to engage a second shaft end 464 of a second section 422b of the trunnion shaft 422. Fasteners may affix the second thrust bearing 453 to the second bearing housing end cap 434. The second shaft end 464 may be disposed within the second bearing housing 429. A second journal bearing 459 may be disposed between the second section 422b of the trunnion shaft 422 and the second bearing housing 429. The second journal bearing 459 can reduce friction between the second section 422b of the trunnion shaft 422 and the second bearing housing 429 as the trunnion shaft 422 rotates. Packing rings (not shown) may seal the trunnion roller end 470 of the second bearing housing 429.

FIG. 4 illustrates the trunnion roller thrust measurement assembly 475 when the axis of rotation 'a' of the trunnion roller 420 is parallel to the axis of rotation 'A' of the rotary drum 412 as shown, for example, in FIG. 2A. The first shaft end 461 may engage the first thrust bearing 455 when the rotary drum 412 transmits a thrust force (TF) that is greater than the mass of the trunnion roller 420 and the trunnion shaft 422. The trunnion roller thrust measurement assembly 475 on the downhill side 421 of the trunnion roller assembly 415 may bear the full thrust force TF of the rotary drum 412 and the additional components of the rotary drum assembly such as the riding rings, drive wheel, etc.

The first bearing housing 427 and the second bearing housing 429 may be mounted in the support frame 437 on the base structure 438 such that the width between the sides 449, 443 of the thrust bearings 453, 455 that face the first and second ends 461, 464 of the trunnion shaft 422 is slightly wider than the length of the trunnion shaft 422 between the first shaft end 461 and the second shaft end 464. The additional spacing can allow for thermal expansion of the trunnion shaft 422 as temperature fluctuates in response to operating and environmental temperatures. When downhill side 421 of the trunnion roller assembly 415 bears the full thrust force (TF) of the rotary drum assembly (e.g., the rotary drum assembly 300 in FIG. 3), the trunnion roller 420 and the trunnion shaft 422 may slide axially toward the first thrust bearing 455 and the first bearing housing end cap 433. The axial slide may create a distance between the second shaft end 464 and the side 449 of the thrust bearings 453 on the uphill side 423, and may cause the downhill bearing housing end cap 433 to bear the thrust force. In this manner, the second shaft end 464 defines a distance 'd' that may be created between the second shaft end 464 and the side 449 of the second thrust bearing 453 that faces the second shaft end 464. In some implementations, the distance sensor 447 may be configured to measure this distance 'd.' It will be understood that this distance 'd' illustrated in FIG. 4 is exaggerated to convey the concept.

In some implementations, the first thrust bearing 455 or the second thrust bearing 453 or both the first thrust bearing 455 and the second thrust bearing 453 may be fixedly engaged to their respective shaft ends 461, 464 of the trunnion shaft 422. In such cases, the distance sensor 447 may be configured to measure a distance between the distal ends 463, 469 of the thrust bearings 455, 453 and the adjacent first bearing housing end cap 433, the second bearing housing end cap 434, or both the first bearing housing end cap 433 and the second bearing housing end cap 434.

Figure 6:
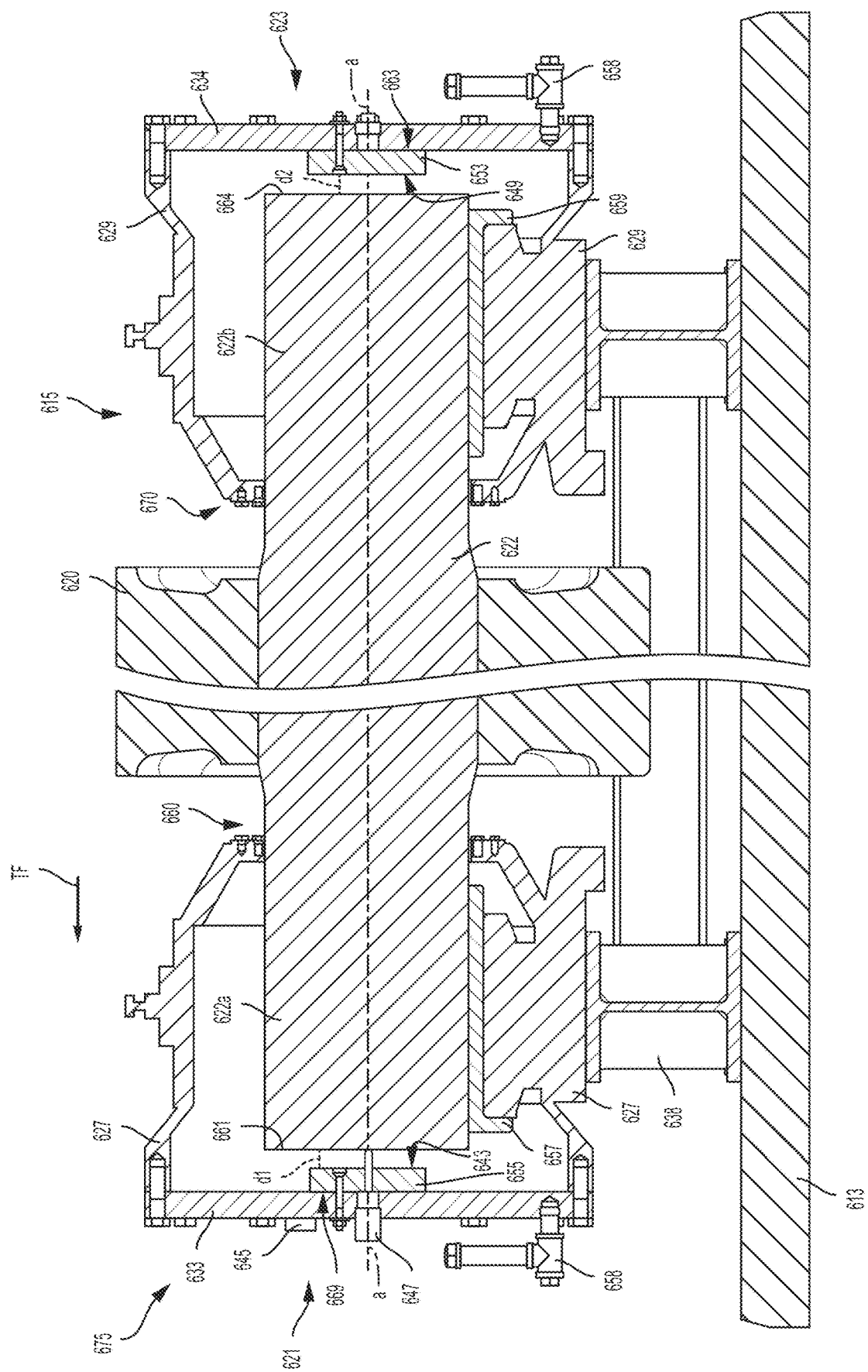
FIG. 6 is a cross-sectional side view of an example of a trunnion roller thrust measurement assembly according to some aspects of the present disclosure.

FIG. 6 is a cross-sectional side view of an example of a trunnion roller thrust measurement assembly 675a, 675b according to some aspects of the present disclosure. FIG. 6 illustrates a case where the axis of rotation 'a' of the trunnion roller 620 has been skewed relative to the axis of rotation 'A' of the rotary drum (see FIG. 2B). When properly skewed, the trunnion roller 620 and trunnion shaft 622 may slide axially toward the uphill end 623 of the trunnion roller assembly 615 creating a first distance 'd1' between the first thrust bearing 655 and the first end 661 of the trunnion shaft 622 and a second distance 'd2' between the second thrust bearing 653 and the second end 664 of the trunnion shaft 622.

Over-skewing (e.g., setting too large an angle with respect to the rotating drum) a trunnion roller assembly 615 can result in the second shaft end 664 butting against the second thrust bearing 653, thereby applying a portion of the thrust force TF to the second bearing housing end cap 634 disposed on the uphill end 623 of the trunnion roller assembly 615. The second bearing housing end cap 634 may not withstand excessive thrust force TF for prolonged periods. Use of the exemplary assemblies, systems, and methods disclosed herein can manage the thrust load on the first bearing housing end cap 633 and the second bearing housing end cap 634. Readings can be taken from the thrust measurement sensor(s) 645 on each trunnion roller assembly 615 and the skew of each trunnion roller assembly 615 adjusted as necessary to relieve or increase the thrust force (TF) on the first bearing housing end cap 633. The thrust forces of all trunnion roller assemblies may be monitored and adjustments may be made to achieve the desired force distribution. Changes in thrust forces noted in the measurement output can provide feedback for additional adjustments of the trunnion roller assemblies.

Figure 7B:
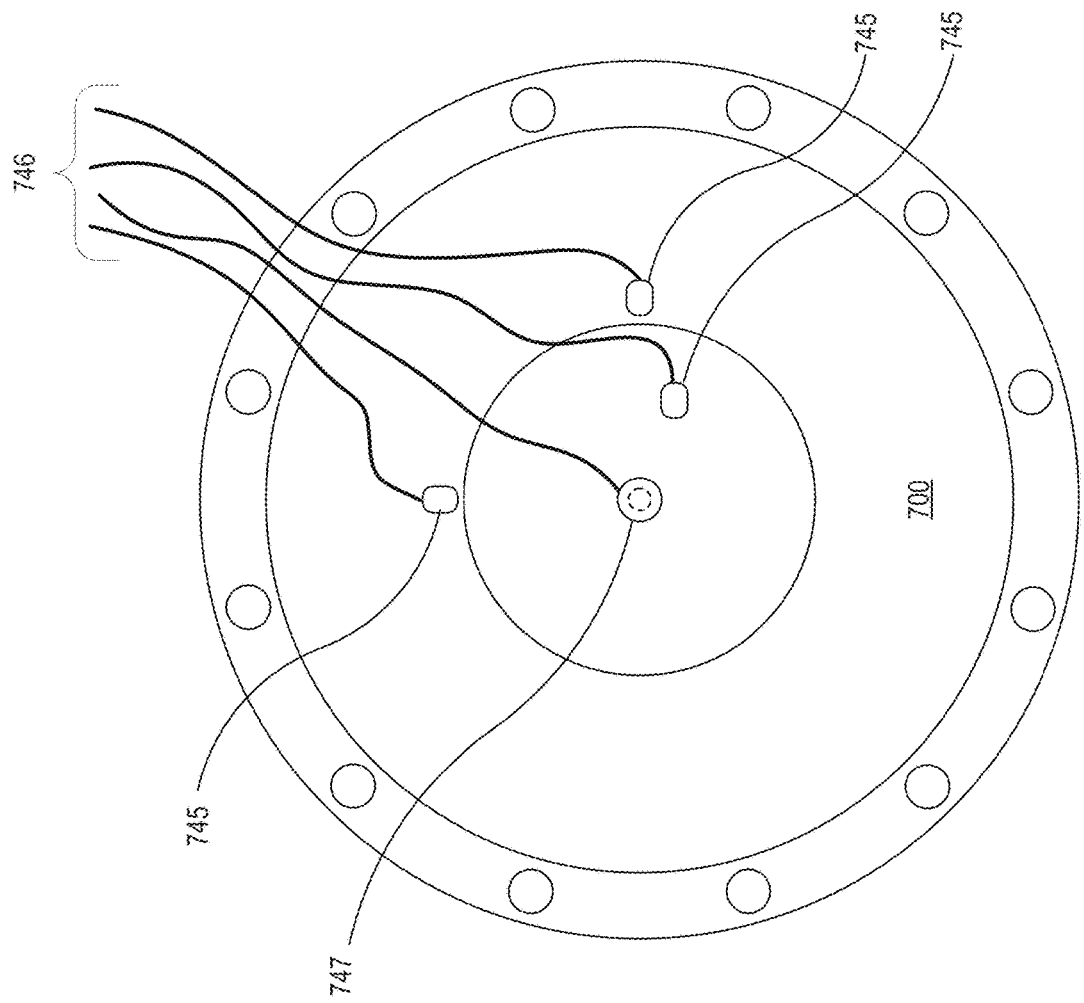
FIG. 7B is a facing view of the example bearing housing end cap of FIG. 7A according to some aspects of the present disclosure.
Figure 7A:
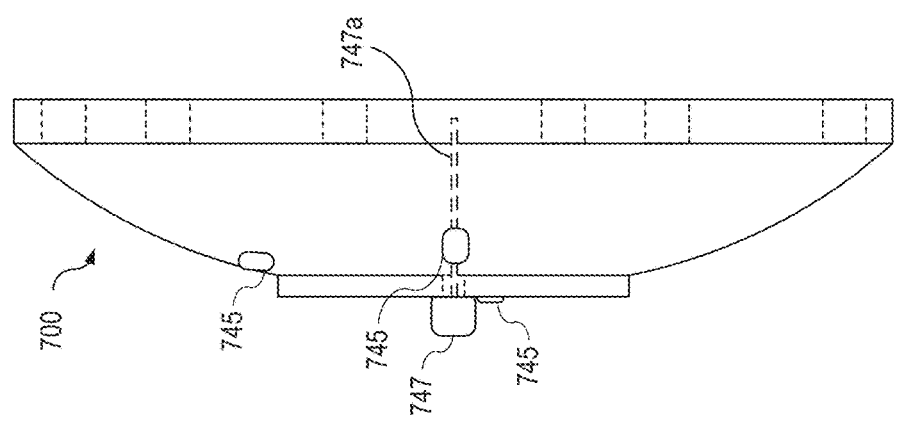
FIG. 7A is a side view of an example of a bearing housing end cap according to some aspects of the present disclosure.

FIG. 7A is a side view of an example of a bearing housing end cap 700 according to some aspects of the present disclosure. As illustrated in FIG. 7A, the bearing housing end cap 700 may be a domed end cap. The bearing housing end cap 700 may be instrumented with thrust sensors 745 (e.g., strain gages or other thrust sensors) and optionally a distance sensor 747 (e.g., an LVDT or other distance sensor). The distance sensor 747 may include a rod 747a. The rod 747a of the distance sensor 747 can extend through a hole in the bearing housing end cap 700 and the thrust bearing (e.g., the thrust bearing 655) and abut an end of the trunnion shaft (e.g., the trunnion shaft end 661) to measure the distance 'd1' between the trunnion shaft end 661 and the thrust bearing 655 (see FIG. 6). In implementations where the thrust bearing 655 is affixed to the trunnion shaft end 661, the rod 747a may extend through the bearing housing end cap 700 and abut the thrust bearing to measure the distance between the thrust bearing and the bearing housing end cap.

FIG. 7B is a facing view of the example bearing housing end cap of FIG. 7A according to some aspects of the present disclosure. As illustrated in FIG. 7B, the thrust sensors 745 and the distance sensor 747 may be coupled to the measurement system (e.g., the measured thrust deviation receiver 906 of the measurement system 900). In some implementations, the thrust sensors and the distance sensor may be wirelessly coupled to the measurement system. While three thrust sensors are illustrated in FIGS. 7A and 7B, more or fewer thrust sensors may be used without departing from the scope of the present disclosure. Further, placements of the thrust sensors on the bearing housing end cap is merely exemplary. Other placements of the thrust sensors on the bearing housing end cap may be used without departing from the scope of the present disclosure.

FIG. 8A is a side view of another example of a bearing housing end cap according to some aspects of the present disclosure. As illustrated in FIG. 8A, the bearing housing end cap 800 may be a flat end cap. The bearing housing end cap 800 may be instrumented with thrust sensors 845 (e.g., strain gages or other thrust sensors) and optionally a distance sensor 847 (e.g., an LVDT or other distance sensor). The distance sensor 847 may include a rod 847a. The rod 847a of the distance sensor 847 can extend through a hole in the bearing housing end cap 800 and the thrust bearing (e.g., the thrust bearing 655) and abut an end of the trunnion shaft (e.g., the trunnion shaft end 661) to measure the distance 'd1' between the trunnion shaft end 661 and the thrust bearing 655 (see FIG. 6). In implementations where the thrust bearing 655 is affixed to the trunnion shaft end 661, the rod 847a may extend through the bearing housing end cap 800 and abut the thrust bearing to measure the distance between the thrust bearing and the bearing housing end cap.

FIG. 8B is a facing view of the example bearing housing end cap of FIG. 8A according to some aspects of the present disclosure. As illustrated in FIG. 8B, the thrust sensors 845 and the distance sensor 847 may be coupled to the measurement system (e.g., the measured thrust deviation receiver 906 of the measurement system 900). In some implementations, the thrust sensors and the distance sensor may be wirelessly coupled to the measurement system. While three thrust sensors are illustrated in FIGS. 8A and 8B, more or fewer thrust sensors may be used without departing from the scope of the present disclosure. Further, placements of the thrust sensors on the bearing housing end cap is merely exemplary. Other placements of the thrust sensors on the bearing housing end cap may be used without departing from the scope of the present disclosure.

FIG. 9 is a block diagram illustrating an example of a measurement system 900 than can be used with the trunnion roller thrust measurement system according to some aspects of the present disclosure. In some implementations, the trunnion roller thrust measurement system may continuously monitor the thrust force on the bearing housing end cap on the downhill end of the trunnion roller assemblies. Referring to FIG. 9, and with reference to FIGS. 3 and 6, the measurement system 900 may include a memory 901, a corrective thrust analyzer 903, a measured thrust deviation receiver 906, a signal generator 909, and a system bus 993. The system bus 993 may communicatively couple the components of the measurement system 900. Baseline thrust values 994 may be stored in the memory 901 of the measurement system 900.

The baseline thrust values 994 may be values for thrust exerted by an end 661, 664 of a trunnion shaft 622 on a thrust bearing 655, 649 attached to an adjacent bearing housing end cap 633, 634, or thrust exerted by a thrust bearing 655, 649 attached to a trunnion shaft 622 on an adjacent bearing housing end cap 633, 634. In some cases, the baseline thrust values 994 may be a range of thrust values indicating acceptable thrust values. For example, the range of thrust values may be a range of discrete thrust values that indicate values in an acceptable high thrust range, an acceptable low thrust range, and a desired thrust range between the high and low thrust ranges. In some cases, the baseline thrust values 994 may be threshold values. The baseline thrust values may be determined based on measurements from the thrust measurement sensor 645 or from manual measurements performed on the rotary drum during start up, while offline, or while the rotary drum assembly is in operation. The baseline thrust values 994 may be manually entered into the measurement system 900 via a user interface and stored in the memory 901. The measurement system 900 may receive a thrust signal from one or more thrust measurement sensor 645 configured to measure the thrust on the bearing housing end caps 633, 634 and may adjust the lateral adjustment mechanism (e.g., the lateral adjustment mechanism 340) to compensate for the deviations in the measured thrust values from the baseline thrust values 994.

In some implementations, the measurement system 900 may employ machine learning to adjust the baseline thrust taking into account at least one of historical measurements for the thrust, real time measurements of the thrust, and manufacturer suggested values for the thrust. Machine learning algorithms build a mathematical model based on sample data, known as "training data", in order to make predictions or decisions without being explicitly programmed to perform the task. In this case, the historical measurements may be employed with operation conditions to provide training data algorithms, which can in turn be employed to use real time data to update the baseline thrust.

The measured thrust deviation receiver 906 may include a power supply 907 configured to supply power to the thrust measurement sensors (e.g., the thrust measurement sensors 645) and the distance sensors (e.g., the distance sensors 647), and a data logger 908 to receive and record signals from the thrust measurement sensors and the distance sensors. The measured thrust deviation receiver 906 may be configured to receive measured thrust deviations between at least one thrust bearing 655 and the adjacent bearing housing end cap 633 of the bearing housing 627. For example, the measured thrust deviation receiver 906 may receive thrust measurement signals from one or more thrust measurement sensors, as well as distance measurement signals from one or more distance sensors. In some implementations, the measured thrust deviation receiver 906 may receive measured thrust deviations between at least one thrust bearing 655 and the end 661 of the trunnion shaft 622.

The corrective thrust analyzer 903 may calculate differences between the thrust deviations and the baseline thrust values. The calculated difference may be used for adjusting the positioning of trunnion roller assemblies 615 to mitigate the effects of variations in thrust and distance between a trunnion shaft end 661 and a thrust bearing 655, or between the thrust bearing 655 and the bearing housing end cap 633.

The corrective thrust analyzer 903 may include a hardware processor 905 configured to perform a set of instructions for comparing the measured thrust deviations to the baseline thrust values. As employed herein, the term "hardware processor subsystem" or "hardware processor" can refer to a processor, memory, software or combinations thereof that cooperate to perform one or more specific tasks. In some implementations, the hardware processor subsystem can include one or more data processing elements (e.g., logic circuits, processing circuits, instruction execution devices, etc.). The one or more data processing elements can be included in a central processing unit, a graphics processing unit, and/or a separate processor or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

The measurement system 900 may be implemented in various configurations, and may include, for example, an integrated power and signal device, or separate power and signal processing devices connected together. The measurement system may be digital or analog, and may be controlled by programmable logic controller ("PLC") logic or relay logic.

The measurement system 900 may be configured to receive thrust measurement data from the thrust measurement sensor 645. The thrust measurement data may be obtained when the trunnion shaft 622 is hot or cold, and/or when the trunnion shaft 622 is offline or running, etc. The corrective thrust analyzer 903 may be configured to compare the thrust measurement data to the previously determined baseline thrust values 994 stored in the memory 901. The corrective thrust analyzer 903 may be further configured to determine whether the deviation between the baseline thrust values and the measured thrust data indicates that the trunnion roller assemblies 615 should be adjusted. For example, the processor 905 of the corrective thrust analyzer 903 may compare the thrust value deviation may to a specified threshold value. The threshold value may be determined by the processor 905 based on predefined rules for calculating a solution to thrust deviations or may be a static value. When the thrust value deviation exceeds the specified threshold, the corrective thrust analyzer 903 may determine that the trunnion roller assemblies 615 should be adjusted. In response to determining that the threshold value has been exceeded, the processor 905 of the measurement system 900 may be configured to cause a notification to be generated indicating that an adjustment of the positions of one or more so the trunnion roller assemblies 615 may be needed. The notification may include information on which trunnion roller assemblies should be adjusted and an amount and direction by which the trunnion roller assemblies should be adjusted. The trunnion roller assemblies may be adjusted, and new measurement data obtained. The trunnion roller assemblies may be readjusted, if necessary, until acceptable thrust measurements are obtained.

In some implementations, the corrective thrust analyzer 903 may compare the received thrust measurement data to the baseline thrust values 994 stored in the memory 901. The baseline thrust values 994 may be a range of thrust values indicating acceptable thrust values. For example, the range of thrust values may be a range of discrete thrust values that indicate values in an acceptable high thrust range, an acceptable low thrust range, and a desired thrust range between the high and low thrust ranges. When the received thrust measurement data indicates that the thrust is approaching an upper end of the acceptable high thrust range or a lower end of the acceptable low thrust range, the processor 905 of the corrective thrust analyzer 903 may cause a notification to be generated. The notification may include information on which trunnion roller assemblies should be adjusted and an amount by which the trunnion roller assemblies should be adjusted. The trunnion roller assemblies may be adjusted, and new measurement data obtained. The trunnion roller assemblies may be readjusted, if necessary, until acceptable thrust measurements are obtained.

In some implementations, automatic adjustment of the skew of the trunnion roller assemblies may be performed based on the determination performed by the measurement system 900. In such implementations, the processor 905 of the corrective thrust analyzer 903 may cause the signal generator 909 to communicate correction signals to the actuators (not shown) to adjust the positions of the trunnion roller assemblies. For example, a mechanical or pneumatic actuator may be provided for each lateral adjustment mechanism (e.g., the lateral adjustment mechanism 340).

The measurement system 900 may be in communication with the lateral adjustment mechanism. In some implementations, the signal generator 909 of the measurement system 900 may be in either wireless communication or wired communication with the actuators. In some implementations, the lateral adjustment mechanism may be a pneumatic system, and the signal generator 909 may be in communication with the pneumatic system. The processor 905 of the measurement system 900 may cause the signal generator 909 to send an adjustment signal to the actuator of the lateral adjustment mechanism when the thrust signal exceeds a threshold or is not within an acceptable range. The adjustment signal may cause the actuator of the lateral adjustment mechanism to adjust the position of a trunnion roller assembly.

Any of the systems or machines (e.g., devices) shown in FIG. 9 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine.

For example, a special purpose computer system able to implement any one or more of the methodologies described herein is discussed above with respect to FIGS. 1-7, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 10:
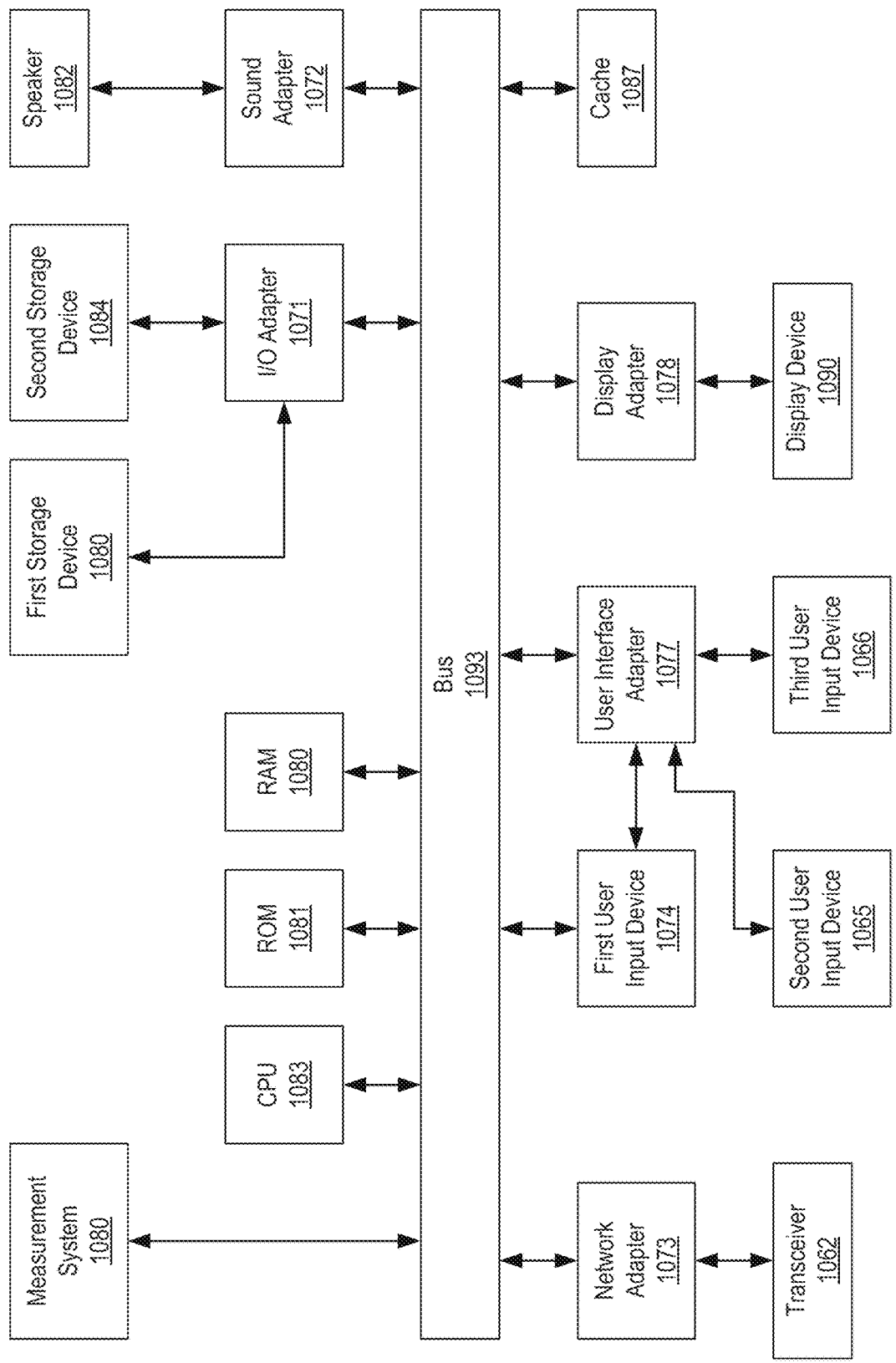
FIG. 10 is a block diagram of a processing system according to some aspects of the present disclosure.

FIG. 10 is a block diagram of a processing system 1000 according to some aspects of the present disclosure. The measurement system 900 may be integrated into the processing system 1000. The processing system 1000 may include at least one processor (CPU) 1083 operatively coupled to other components via a system bus 1093. A cache 1087, a Read Only Memory (ROM) 1081, a Random Access Memory (RAM) 1080, an input/output (I/O) adapter 1071, a sound adapter 1072, a network adapter 1073, a user interface adapter 1077, and a display adapter 1078, are operatively coupled to the system bus 1093. The bus 1093 may interconnect a plurality of components of the processing system 1000.

Data, for example, the baseline thrust data, and commands may be input to the processing system 1000 from at least one input device 1074, 1065, 1066. The at least one input device 1074, 1065, 1066 may be any computing device, such as a desktop computer, mobile computer, laptop computer, tablet, smart phone and/or computer specific to the roller thrust measurement and adjustment system. The input devices 1074, 1065, 1066 may be in communication with the user interface adapter 1077 via a wireless connection, or the input devices 1074, 1065, 1066 may be hard wired into electrical communication with the user interface adapter 1077.

The processing system 1000 may further include a first storage device 1080 and a second storage device 1084 operatively coupled to system bus 1093 by the I/O adapter 1071. The storage devices 1080 and 1084 can be any of a disk storage device (e.g., a magnetic or optical disk storage device), a solid state magnetic device, and so forth. The storage devices 1080 and 1084 can be the same type of storage device or different types of storage devices.

A speaker 1082 or other audio output device may be operatively coupled to the system bus 1093 by the sound adapter 1072. A transceiver 1062 may be operatively coupled to system bus 1093 by network adapter 1073. A display device 1090 may be operatively coupled to system bus 1093 by display adapter 1078. A first user input device 1074, a second user input device 1065, and a third user input device 1066 may be operatively coupled to system bus 1093 by user interface adapter 1077. The user input devices 1074, 1065, and 1077 can be any of a keyboard, a mouse, a keypad, an image capture device, a motion sensing device, a microphone, a device incorporating the functionality of at least two of the preceding devices, or other types of input devices. The user input devices 1074, 1065, and 1077 may be the same type of user input device or different types of user input devices. The user input devices 1074, 1065, and 1077 may be used to input and output information to and from the processing system 1000.

The processing system 1000 may also include other elements (not shown), as readily contemplated by one of skill in the art, as well as omit certain elements. For example, various other input devices and/or output devices can be included in processing system 1000, depending upon the particular implementation of the same. For example, various types of wireless and/or wired input and/or output devices can be used. Moreover, additional processors, controllers, memories, and so forth, in various configurations can also be utilized.

Figure 11:
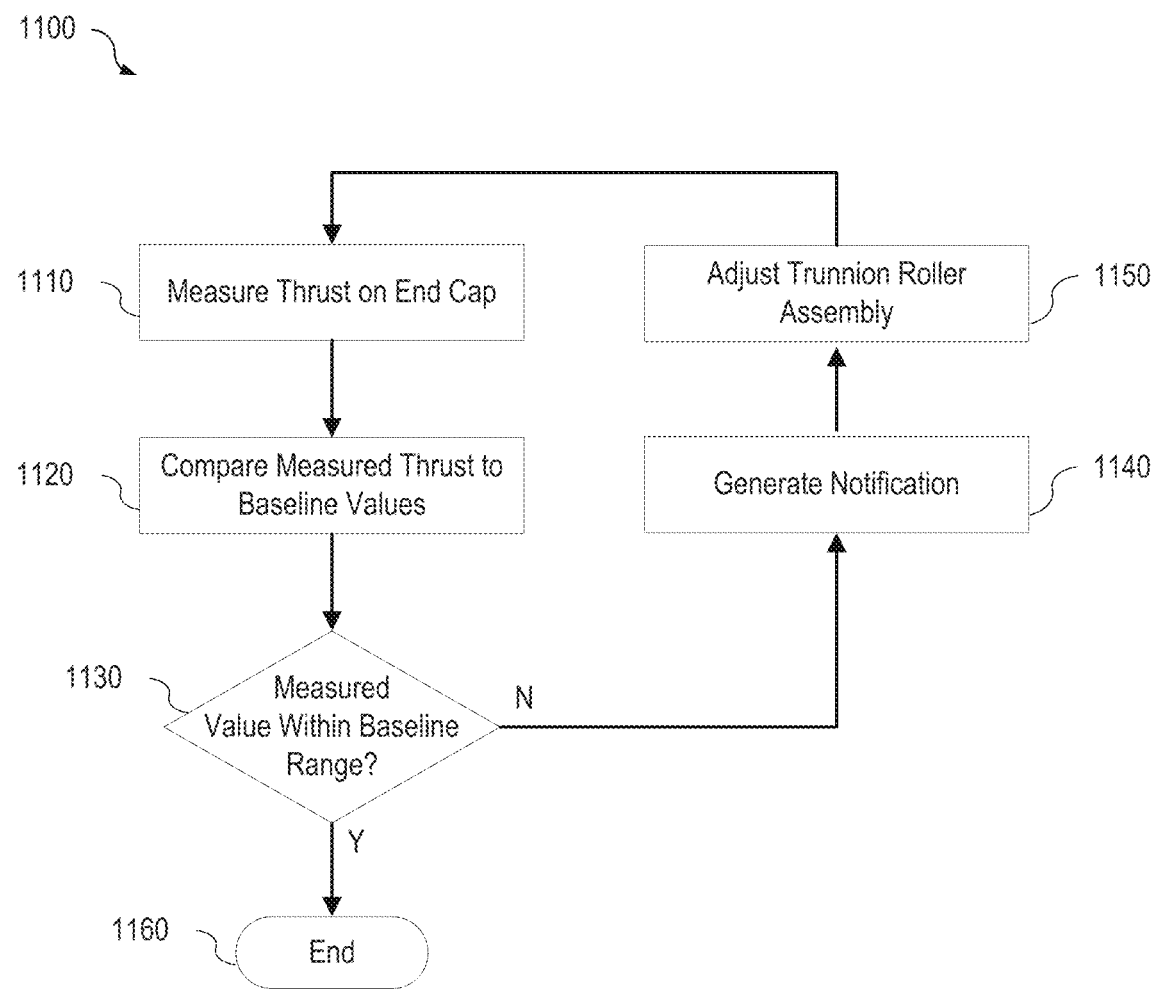
FIG. 11 is a flowchart illustrating a method for adjusting trunnion bearing assemblies for a rotary drum using a trunnion roller thrust measurement system according to some aspects of the present disclosure.

FIG. 11 is a flowchart illustrating a method for adjusting trunnion bearing assemblies for a rotary drum using a trunnion roller thrust measurement system according to some aspects of the present disclosure. Referring to FIG. 11, at block 1110, thrust on a bearing housing end cap may be measured. In some implementations, the thrust sensors (e.g., the thrust sensors 445) may measure the thrust on the bearing housing end cap (e.g., the bearing housing end cap 433) generated by the trunnion shaft 422 (e.g., the end 461 of the trunnion shaft 422) loading the thrust bearing 655 that is attached to the bearing housing end cap. In some implementations, the thrust sensors may measure the thrust of the thrust bearing 655 attached to the trunnion shaft that is loading the bearing housing end cap 633. The thrust measurement sensors 645 may transmit thrust signals to the measurement system (e.g., the measured thrust deviation receiver 906 of the measurement system 900).

At block 1120, the measured thrust values may be compared to baseline values. The measurement system 900 (e.g., the corrective thrust analyzer 903 of the measurement system 900) may compare the measured thrust values to the baseline thrust values 994 stored in memory. The baseline thrust values may be values for thrust exerted by an end of a trunnion shaft on a thrust bearing attached to a bearing housing end cap or for thrust exerted by a thrust bearing attached to a trunnion shaft on an adjacent bearing housing end cap. In some implementations, the corrective thrust analyzer may compare the measured thrust values to threshold values determined based on the baseline thrust values. In some implementations, the corrective thrust analyzer may compare the measured thrust values to a range of thrust values indicating acceptable thrust values. For example, the range of thrust values may indicate values in an acceptable high thrust range, an acceptable low thrust range, and a desired thrust range between the high and low thrust ranges.

At block 1130, it may be determined whether the measured thrust values are within the baseline thrust values. In some implementations, the corrective thrust analyzer may determine whether the measured thrust values exceed a threshold. In some implementations, the corrective thrust analyzer may determine whether the measured thrust value are within an acceptable range of thrust values. In response to determining that the measured thrust values are within the baseline thrust values (1130-Y), at block 1160, the method may end.

In response to determining that the measured thrust values are not within the baseline thrust values (1130-N), at block 1140, a notification may be generated. For example, the processor 905 of the measurement system 900 may cause a notification to be generated indicating that an adjustment of the positions of one or more of the trunnion roller assemblies may be needed. The notification may include information on which trunnion roller assemblies should be adjusted and an amount and direction by which the trunnion roller assemblies should be adjusted.

At block 1150, the trunnion roller assemblies may be adjusted. For example, using the information in the notification generated by the measurement system, the skew of one or more trunnion roller assemblies may be adjusted using the lateral adjustment mechanism. After adjustment of the trunnion roller assemblies, the process may be repeated starting at block 1110 until the measured thrust values are correct. In some implementations, the adjustments of the trunnion roller assemblies may be performed manually. In some implementations, the adjustments of the trunnion roller assemblies may be performed automatically by communication between the measurement system and actuators for the lateral adjustment mechanisms.

The specific operations illustrated in FIG. 11 provide a particular method for adjusting trunnion bearing assemblies for a rotary drum according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 11 may include multiple sub-operations that may be performed in various sequences as appropriate to the individual operation. Furthermore, additional operations may be added or removed depending on the particular applications.

The method 1100 may be embodied on a non-transitory computer readable medium, for example, but not limited to, the memory 901 or other non-transitory computer readable medium known to those of skill in the art, having stored therein a program including computer executable instructions for making a processor, computer, or other programmable device execute the operations of the method.

The embodiments according to the present disclosure may be a system, a method, and/or a computer program product at any technical detail level of integration. The computer program product can provide a method for maintaining a desirable level of thrust between a thrust bearing and a trunnion shaft of a trunnion roller assembly.

A computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the invention.

What is claimed is:

1. A trunnion roller thrust measurement assembly, comprising:
    a trunnion roller assembly, including:
        a roller configured to provide rotary support of a rotary drum;
        a shaft attached to the roller, the shaft being aligned with an axis of rotation of the roller; and
        a bearing housing configured support an end of the shaft;
    a thrust measurement assembly, including:
        a bearing housing end cap attachable to an end of the bearing housing; and
        a set of thrust sensors disposed on an outer surface of the bearing housing end cap,
        wherein the set of thrust sensors are configured to sense a thrust force exerted on the bearing housing end cap by an axial displacement of the shaft, and
        wherein an adjustment mechanism is utilized to skew the roller based on the sensed thrust force; and
    a distance sensor disposed on the bearing housing end cap,
    wherein the distance sensor is configured to sense a distance between the end of the shaft and a thrust bearing disposed on the bearing housing end cap.

2. The trunnion roller thrust measurement assembly of claim 1, wherein the trunnion roller assembly is configured to support the rotary drum at an angle with respect to ground, and
    wherein the bearing housing end cap is attachable to a downhill end of the bearing housing of the trunnion roller assembly with respect to the angle of the rotary drum.

3. The trunnion roller thrust measurement assembly of claim 1, wherein the bearing housing end cap comprises a thrust bearing, and
    the set of thrust sensors are configured to sense a thrust force exerted on the bearing housing end cap by a thrust force exerted on the thrust bearing by the shaft.

4. The trunnion roller thrust measurement assembly of claim 1, wherein the set of thrust sensors is a set of strain gages.

5. The trunnion roller thrust measurement assembly of claim 1, wherein the distance sensor is a linear variable differential transformer (LVDT).

6. The trunnion roller thrust measurement assembly of claim 1, wherein the set of thrust sensors are configured to communicate sensed thrust forces exerted on the bearing housing end cap to a measurement system.

* * * * *